B. HASKINS.
SWITCH.
APPLICATION FILED APR. 27, 1910.

1,007,948.

Patented Nov. 7, 1911.
6 SHEETS—SHEET 1.

Witnesses
Rob. E. Stoll.
Chas. L. Byron.

Inventor
Bradley Haskins
By Chas. E. Lord
Attorney

B. HASKINS.
SWITCH.
APPLICATION FILED APR. 27, 1910.

1,007,948.

Patented Nov. 7, 1911.
6 SHEETS—SHEET 3.

Witnesses
Rob. E. Hyll.
Chas. L. Byron

Inventor
Bradley Haskins
By Chas. E. Lord
Attorney

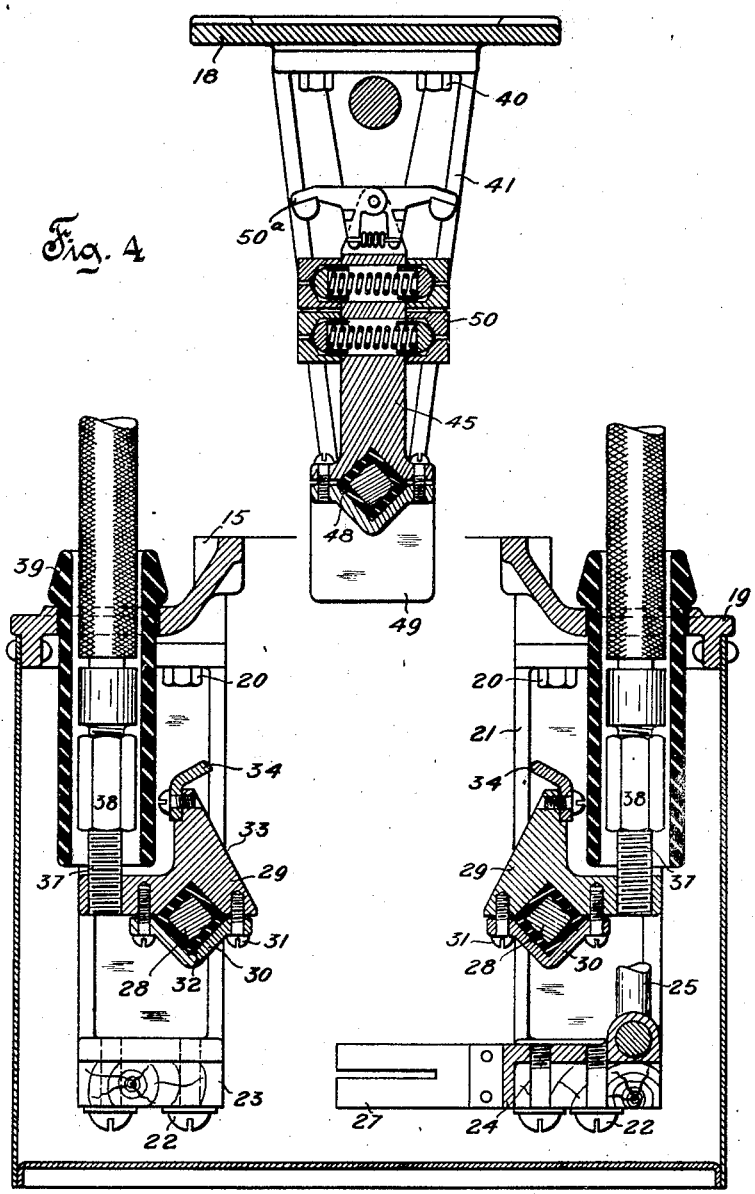

B. HASKINS.
SWITCH.
APPLICATION FILED APR. 27, 1910.
1,007,948.
Patented Nov. 7, 1911.
6 SHEETS—SHEET 5.
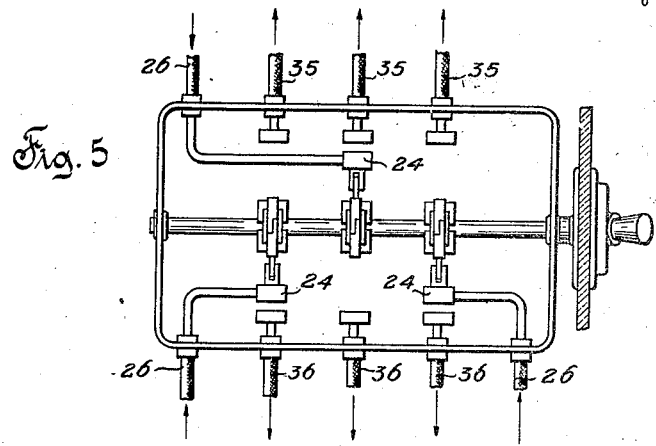
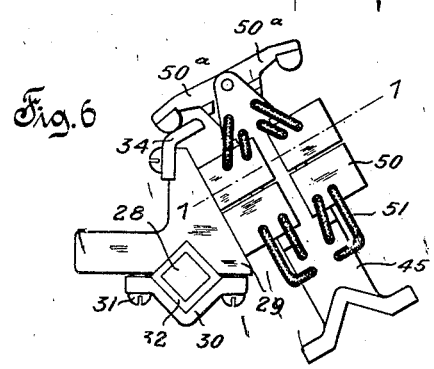
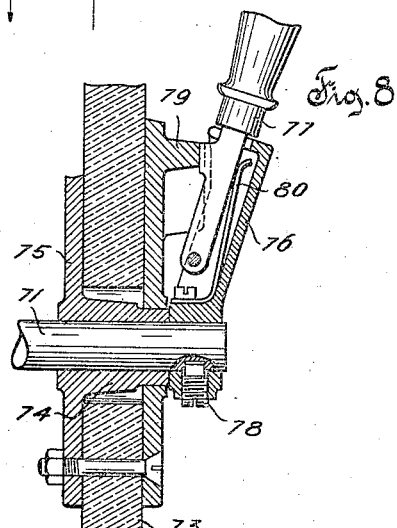
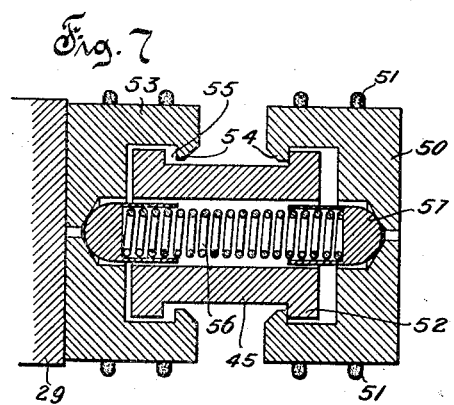
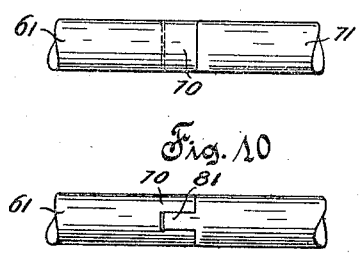
Witnesses
Rob. E. Holl.
Chas. L. Byron
Inventor
Bradley Haskins
By Chas. E. Lord
Attorney

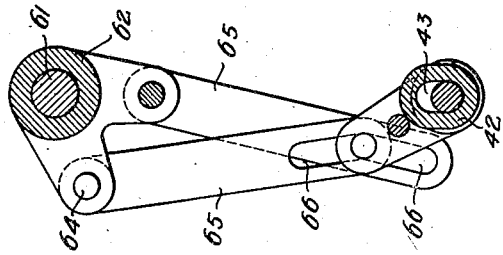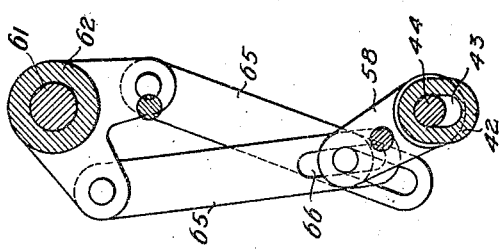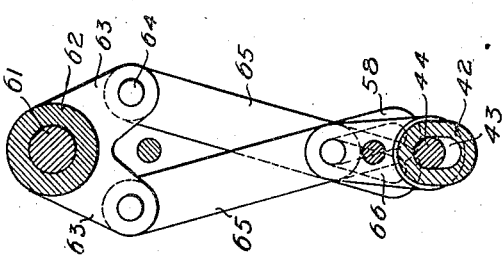

UNITED STATES PATENT OFFICE.

BRADLEY HASKINS, OF MILWAUKEE, WISCONSIN, ASSIGNOR TO ALLIS-CHALMERS COMPANY, A CORPORATION OF NEW JERSEY.

SWITCH.

1,007,948.  Specification of Letters Patent.  Patented Nov. 7, 1911.

Application filed April 27, 1910. Serial No. 558,048.

*To all whom it may concern:*

Be it known that I, BRADLEY HASKINS, a citizen of the United States, residing at Milwaukee, in the county of Milwaukee and State of Wisconsin, have invented certain new and useful Improvements in Switches, of which the following is a full, clear, and exact specification.

This invention relates to improvements in electric switches and particularly in oil switches such as are employed in circuits of high voltage and large amperage.

One of the objects of the invention is to provide a switch which is simple in construction and operation, and particularly to provide a double throw switch which is compact, consists of few parts, and is so constructed that one set of terminals may be connected to either of two other sets of terminals in a simple but very effective manner.

A further object is to provide a switch, especially of the single break rotary type, having a construction such that after the movable contacts have been swung by rotary movement into engagement with the stationary contacts, the engaging contacts will be given a relatively linear movement causing a wiping and cleaning action which maintains the engaging or contact faces free from dirt, grit and particles of fused copper; which prolongs the life of the contacts and renders their use and operation more satisfactory.

A further object is to provide a switch wherein the movable contact members, which are normally connected to terminals of the leading-in conductors, are in the form of a unit which may be readily removed as a whole from the tank and other parts of the switch.

Further objects will appear from the following detailed description.

The invention may be briefly summarized as consisting in certain novel details of construction and combinations and arrangements of parts which will be described in the specification and set forth in the appended claims.

Reference is had to the accompanying sheets of drawings, wherein—

Figure 1:
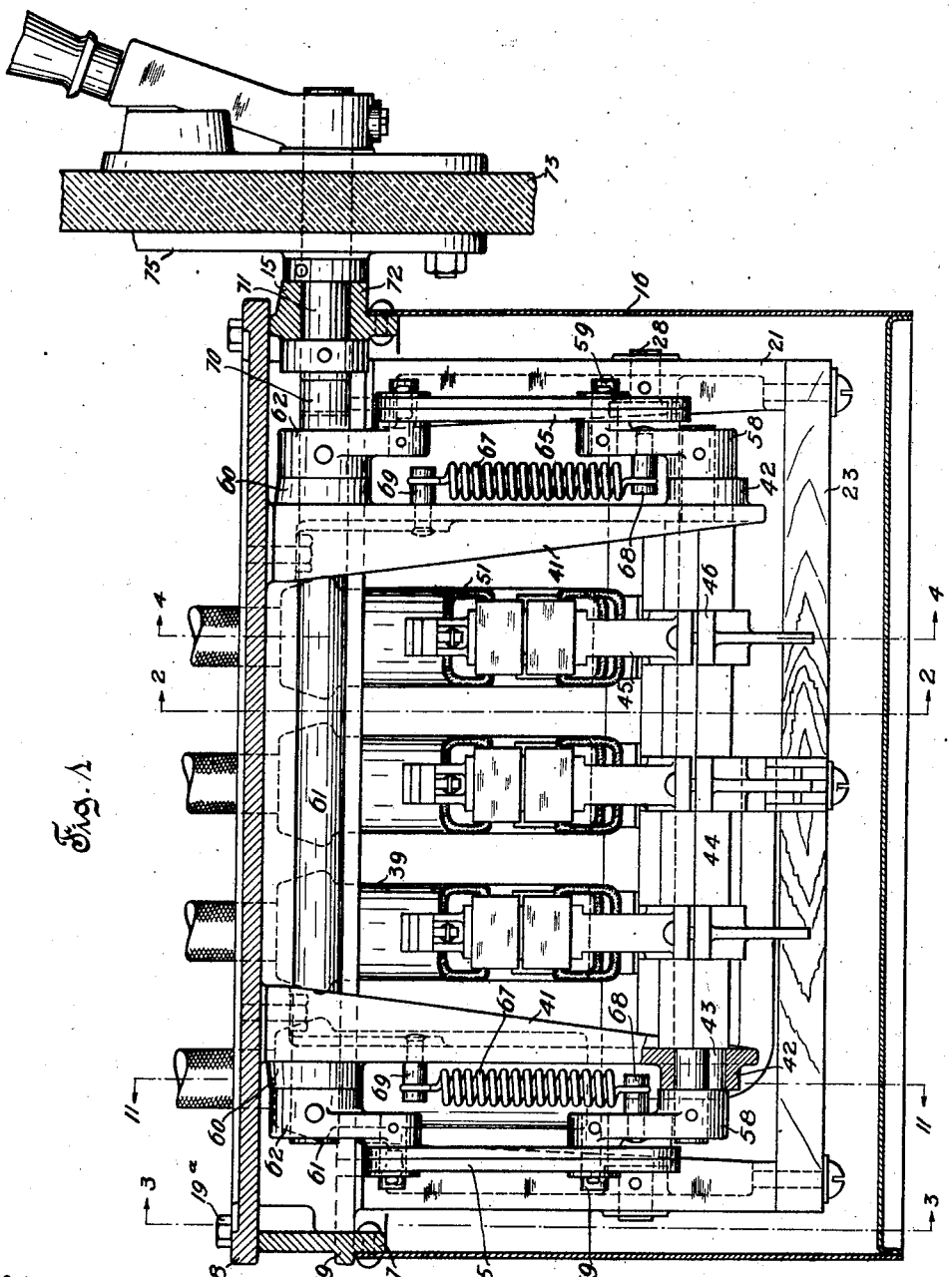
Figure 2:
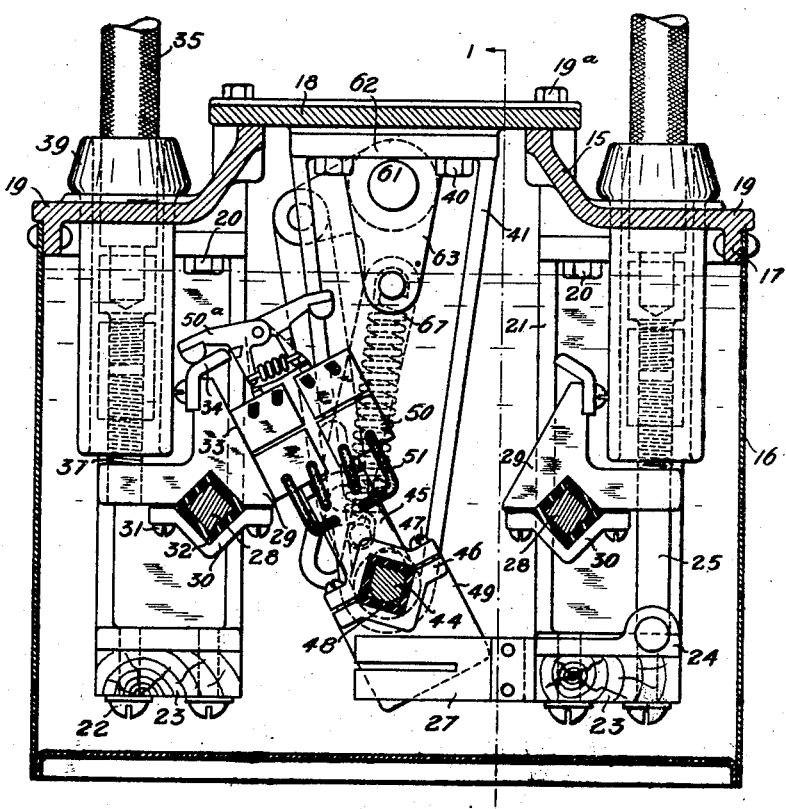
Figure 3:
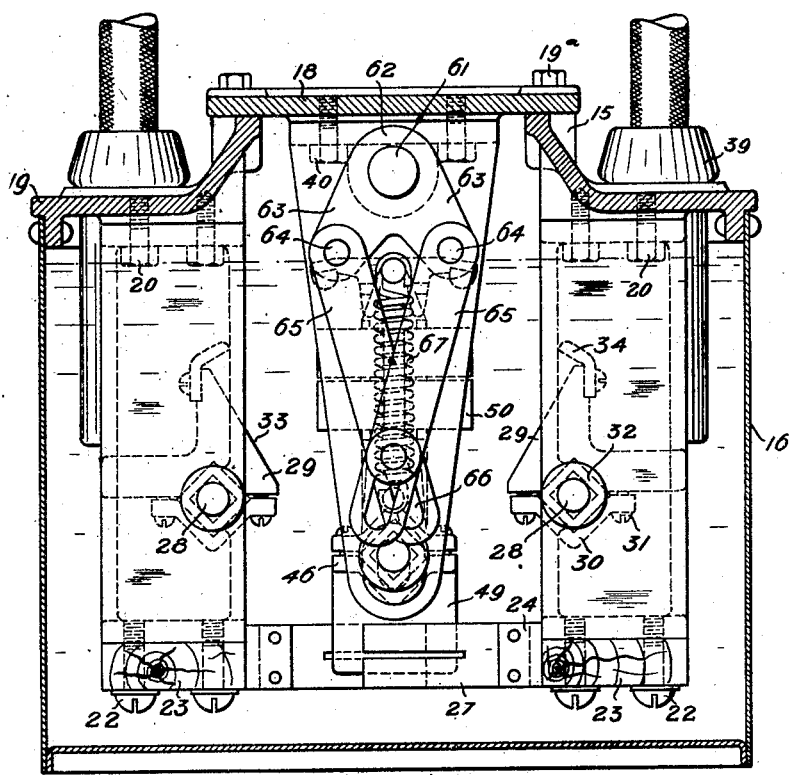

Figure 1 is a longitudinal vertical view through an oil switch constructed in accordance with my invention, parts being removed to show a view substantially along the line 1—1 of Fig. 2, looking in the direction indicated by the arrows; Fig. 2 is a transverse sectional view substantially along the line 2—2 of Fig. 1, looking in the direction indicated by the arrows, the switch being here shown in one of its closed positions; Fig. 3 is a transverse sectional view substantially along the line 3—3 of Fig. 1 looking in the direction indicated by the arrows, the switch being here shown in open position; Fig. 4 is a transverse view substantially along the line 4—4 of Fig. 1, looking in the direction indicated by the arrows, the removable unit being shown as partially removed from the tank; Fig. 5 is a diagrammatic top plan view of the switch, showing particularly the different contact and line terminals, it being understood that the parts are shown conventially, and not in their exact relative positions or proportions; Fig. 6 is a side elevation of one set of coöperating stationary and movable contacts; Fig. 7 is an enlarged sectional view through the same, the section being taken substantially along the line 7—7 of Fig. 6; Fig. 8 is a sectional elevation taken through a portion of the switch board and a portion of the operating mechanism, this figure showing particularly the construction of the operating handle; Fig. 9 is a side elevation of the clutch which is employed between the handle and the switch; Fig. 10 is a top plan view of the same; Fig. 11 is a partial sectional view substantially along the line 11—11 of Fig. 1, looking in the direction indicated by the arrows, this figure showing the positions of certain parts of the operating mechanism when the switch is in open position; Fig. 12 is a similar view showing the positions of the same parts when the switch is partially closed; and Fig. 13 is a similar view showing the position of the same parts when the switch is in one of its closed positions.

Referring now to the figures of the drawings, wherein I have shown a three pole oil switch, 15 represents a frame which supports the contact mechanism and part of the operating mechanism of the switch and forms a cover for the oil tank 16, which incloses the contact mechanism, this frame or cover having around its outer edge a depending flange 17 to which the oil tank is secured either permanently or in a manner such that it may be removed at will. A central section 18 of the cover 15, which, as shown clearly in Fig. 2, is somewhat elevated with respect to the side portions 19 of the cover, is removable with respect to the other portions of the cover and the oil tank and may be secured in place by means of bolts 19ᵃ. This removable section 18 carries and supports on its underside the movable contact mechanism which may, therefore, be removed with the section 18, as will be explained presently.

Secured to the underside of the cover 15 by means of bolts or screws 20 are two sets of depending brackets 21, two such brackets being secured to the cover adjacent each end of the tank and near opposite sides thereof, the brackets being secured to the relatively non-removable part of the cover. Secured by screws 22 to the lower ends of the brackets and extending longitudinally of the tank near the bottom thereof are two wooden or other insulating supporting bars 23 to which are secured a number of terminals 24, three being provided for a three pole switch and each having secured thereto an upwardly extending terminal rod 25. In this case one of the supporting bars 23 carries one of the terminals and the other bar 23 carries the other two terminals, the three terminals being spaced longitudinally of the tank and being staggered, as shown most clearly in Fig. 5. The terminal rods 25 are connected respectively to three line conductors 26, which may be termed "leading-in" conductors so as to distinguish from the "leading-out" conductors which are to be referred to presently and which carry the current from the switch. The terminals 24 carried by both supporting bars 23 are provided with inwardly projecting jaws 27, the jaws on each terminal being adapted to be engaged by and to receive a depending tongue on one of the movable contact members, as will be explained. It will be understood that there is one of these terminals 24 for each pole of the switch, and if the number of poles is greater or less than the number here shown, the number of terminals 24 will be correspondingly varied. Also secured to the brackets 21 and extending longitudinally of the switch above the supporting bars 23 are two contact supporting rods 28 each of which has secured thereto three stationary contacts 29, there being two of such members 29, located on opposite sides of the switch, for each pole of the switch. The contacts 29 are secured to the supporting rods 28, which are preferably squared as shown, by caps 30 and screws 31, the contacts 29 being separated from the rods by insulation 32 which covers the rods, and each being provided with an auxiliary contact or arcing tip 34. The contacts 29 are spaced equal distances apart on each rod 28 and those supported by one rod are located directly opposite the contacts supported on the opposite rod 28. It may be here stated that the contacts 29 which are on one side of the switch or which are supported on one of the rods 28 are connected to one set of "leading-out" line conductors 35, and those supported on the opposite side of the switch are connected to the other set of "leading-out" conductors 36. The contacts 29 are connected to vertical terminal rods 37, and these terminal rods 37 and the terminal rods 25 are connected to the conductors 35, 36, and 26 by conductors 38 shown most clearly in Fig. 4. The three leading-in conductors 26, the three leading-out conductors 35, and the three leading-out conductors 36 extend through insulating bushings 39, which are supported in suitable openings arranged in the side portions 19 of the cover or frame 15, there being, therefore, four bushings and four conductors extending through the cover on one side of the switch, and five bushings and five conductors extending through the cover on the opposite side of the switch, as shown most clearly in Fig. 5. It will be understood, of course, that the number of line conductors and contact members will depend upon the number of poles of which the switch is composed, and that for each pole of the switch there are three such conductors.

As before stated, the movable contact mechanism is in the form of a unit which is supported by the removable section 18 of the cover. By referring to the different figures of the drawing, it will be seen that the section 18 of the cover has secured to its lower side by means of bolts or screws 40 two depending brackets 41 which are arranged near opposite ends of the tank. By referring particularly to Figs. 1, 11, 12, 13 it will be seen that these brackets are provided near their lower ends with bosses 42 having elongated vertical slots 43, and supported by these two brackets 41 in the elongated slots, in a manner such that it may be turned or oscillated and also given a slight vertical movement, as will be explained, is a movable contact supporting rod 44 which is squared throughout the greater portion of its length but has rounded or cylindrical end portions which are received with a working fit in the slots 43 and extend for short distances beyond the bosses 42. Clamped to this rod 44 are three movable contact members, each comprising an upwardly projecting arm 45 and a cap 46, which are clamped together about the rod by screws 47 and are separated from the rod by insulation 48. These contact members are equally spaced on the rod and each is arranged in the plane of and between the two contacts 29 corresponding to one pole of the switch. The caps 46, which form part of the movable contact members, are provided, as shown clearly in several figures of the drawings, with tongues 49 which enter or extend between with a close but working fit, the jaws 27 of the different terminals 24, to which, as before stated, the leading-in conductors 26 are connected. These terminals 24 and their jaws 27 and the tongues 49 of the movable contact members are so located in the switch that when the unit is inserted in the switch to its operative position, each of the tongues 49 will engage one set of jaws carried by one of the terminals 24 and will be in good electrical contact therewith. The jaws have sufficient length that the tongues will at all times engage the same with ample contact surface whether the movable contact members are swung to one extreme position or the other.

Each of the arms 45 of the movable contact members is provided with two pairs of oppositely disposed yieldable contacts 50 which are connected to the arm 45 by flexible conductors 51. By referring particularly to Fig. 7, it will be seen that each of the arms 45 is provided on opposite sides and along its edges with flanges or ridges 52, and that each of the contacts 50 is somewhat U-shaped and has arms 53 which straddle or extend on opposite sides of the arm and are provided at their extreme ends with inwardly extending flanges 54 forming grooves 55 which receive loosely the flanges or ridges 52 on the arm. These contacts, as before stated, are arranged in pairs, and the oppositely disposed members of each pair are spread apart by a coil spring 56 which extends through an opening in the arm 45 and has its ends received within thimbles 57 having rounded end portions which seat within recesses in the inner faces of the two contacts 50. As will be apparent, particularly from Fig. 2, two of the contacts 50, one of which is located directly above the other, are adapted to engage the inclined face 33 of one stationary contact 29 on one side of the switch, and the other two contacts 50 carried by the same arm 45 are adapted to engage in a like manner the inclined face of the corresponding contact 29 located on the opposite side of the switch. It will also be seen that when the contacts 50 engage the stationary contacts 29, the former may yield and it will therefore be unnecessary that the parts be very accurately machined in order to secure good and satisfactory engagement between the contacts of the different poles of the switch. At the outer end of each arm 45 are two pivoted auxiliary contact arms 50ª, each of which is provided with an arcing tip adapted to engage one of the auxiliary contacts or arcing tips 34 carried by the stationary contacts 29.

The operating mechanism for the switch will now be explained. Secured to the ends of the rod 44 which project beyond the bosses 42 at the lower ends of the brackets 41 are two cranks 58 provided at their free ends respectively with outwardly projecting pins 59. These cranks stand vertically when the switch is open and are adapted to be turned in one direction or the other by mechanism connected to the operating handle. Journaled in bosses 60 near the upper ends of the brackets 41 and located just below the cover 15 is a shaft 61 to which is secured adjacent the bosses 60 of the brackets 41 two double cranks 62 similar in shape to bell cranks. Each of these double cranks 62, which, as shown clearly in Fig. 1, are located adjacent opposite ends of the switch directly above the cranks 58 which are secured to the movable contact-carrying rod 44, is provided with two diverging crank arms 63, (see Figs. 2 and 3,) each of which is provided at its free or lower end with a pin 64. Oscillatory or rotary movement of the shaft 61 and of the double cranks 62 is transmitted to the cranks 58 and to the movable contact carrying rod 44 by two sets or pairs of links 65, the links of each pair being loosely connected respectively to the pins 64 of the arms of one of the double cranks 62 and being provided at their lower ends with elongated slots 66 which receive loosely the pin 59 on one of the cranks 58. The movable contact mechanism is normally held in the position shown in Fig. 3, with the cranks 58 vertical and the pins 59 on the cranks 58 engaging the upper ends of the elongated slots 66 in the links 65, by means of two coil springs 67, the lower ends of which are connected to inwardly projecting pins 68 on the two cranks 58 respectively and the upper ends of which are connected to relatively stationary pins 69 projecting outwardly from the brackets 41.

The shaft 61 is connected by a clutch 70 to a shaft or shaft section 71, the axis of which is in line with the axis of the shaft 61, and which is journaled in a boss 72 located in a portion of the depending flange 17 of the frame adjacent a switch panel 73 at one side of which the switch is supported. The shaft 71 is also journaled in a boss 74 which is integral with a plate 75 and projects outwardly through an opening in the panel 73 (see Fig. 8). The shaft 71 projects outwardly beyond the panel and beyond the boss 74 of the plate 75 and has secured to its outer end a two-part handle which is adjacent the front of the switch board and is adapted to be turned in one direction to connect the movable contacts with one set of stationary contacts, and to be turned in the opposite direction to connect the movable contacts with the other set of stationary contacts. The handle consists in this case of two parts 76 and 77, the part 76 being secured by a set screw 78 to the end of the shaft 71, and the part 77 being pivotally connected to the part 76 and coöperating with a notched plate 79 secured to the front of the panel 73. The part 77 is pressed by a leaf spring 80 toward the notched plate 79, the handle being so constructed that when it is desired to open or close the switch the part 77 is moved outwardly by hand, so that it is free of the notches and is then turned to another position and caused to engage in another notch of the plate 79.

As before stated the shaft 61 and the shaft 71 are connected by a clutch 70. This clutch is provided to enable the movable contact mechanism and the shaft 61, together with the parts connected thereto, to be removed as a unit from the switch. By referring to Figs. 9 and 10 it will be seen that the clutch consists of a slot provided at the outer end of the shaft 61, and of a tongue 81 formed on the inner end of the shaft 71 and arranged to engage in this slot. This clutch is so formed that when the switch is in open position, the tongue and slot are vertical, with the result that the parts of the clutch can be separated and the unit can be lifted vertically from the tank only when the switch is open.

The operation and the advantages of my improved switch will now be explained. As previously stated, the leading-in or current-supplying conductors are connected to the terminals 24, and one set of leading-out conductors is connected to the contacts 29 on one side of the switch, and the other set of leading-out conductors is connected to the contacts 29 supported on the opposite side of the switch; and when the switch is in open position, the movable contact arms 45 are in vertical position midway between the two sets of contacts 29 and the tongues 49 are in engagement with the jaws 27 on the terminals 24. When it is desired to connect the leading-in or current-supplying conductors to one set of leading-out conductors, the switch handle, shaft 71 and shaft 61 are turned in one direction. This movement of the shaft 61 causes the rod 44 to be turned, swinging the arms 45 and stretching or increasing the tension of the coil springs 67 which during the first part of the closing movement or until after the yielding contacts 50 engage the stationary contacts 29, hold the ends of the rod 44 in the upper ends of the slots 43 provided in the lower ends of the brackets 41. After the contacts 50 on the arms 45 engage the inclined faces of the contacts 29, they will yield toward the arms 45, as shown in Fig. 7, and further movement of the handle will cause the two links (one at each end of the switch) which are bearing down on the pins 59, to shift the rod 44 downwardly or vertically into the lower portion of the slots 43, this final movement causing the contacts 50 which engage the contacts 29 to slide linearly over the faces of the latter and causing a relative wiping and cleaning action which maintains the contact faces smooth and free from particles which would affect the satisfactory operation of the switch.

In Fig. 11 are shown the relative positions of the links 65, one of the double cranks 62, crank 58, rod 44, and slot 43 which receives one end of the rod 44, when the switch is in open position. In Fig. 12 are shown the relative positions of these parts just after the contacts 50 engage the contacts 29 and before the final closing movement of the switch; and in Fig. 13 are shown the relative positions of these parts after the final closing movement of the switch and after the relative sliding, and wiping and cleaning action has taken place. It will be seen that with this construction the engaging faces will be maintained clean and that the lives of the contacts will be prolonged and their operation will be much more satisfactory than if the movable contacts were merely swung into and out of engagement with the stationary contacts in opening and closing the switch. While the switch is being closed, the tongues 49 slide in the jaws 27 of the terminal members 24 and remain in contact with these jaws at all times while the removable unit is in normal position, whether the switch is open or closed. While the switch is being closed, the springs 67 are elongated and placed under increased tension, so that when the portion 77 of the handle is released from the proper notch in the plate 79 after the switch has been closed, these springs 67 will return the switch to its open position or to a position midway between the two sets of contacts 29. It will be understood that when it is desired to connect the leading-in conductors to the other set of leading-out conductors or to the other circuit, the handle will be turned in the opposite direction to that referred to, and after the contacts 50 engage the contacts 29 corresponding to said second set of leading-out conductors, the engaging contacts will be given the relative sliding movement previously described. If it is desired to inspect, clean or repair the contact members, the switch will be placed in open position with the tongue 81 of the clutch 70 vertical, after which the switch unit, consisting of all movable contact members, shaft 61 and mechanism for transmitting movement from the shaft 61 to the movable contact members, can be removed from the tank by loosening or removing the screws 19ª which hold the removable section 18 of the cover to the relatively non-removable portion. In lifting this unit from the tank the movable contact members are disconnected from the leading-in conductors by the disengagement of the tongues 49 from the jaws 27. In restoring the unit into the tank, the tongues 49 engage the jaws 27, and again place the movable contact members in electrical connection with the terminals 24 and leading-in conductors.

The double throw switch which I have provided is compact, and simple in construction and operation. Furthermore, with the means which I have provided for connecting and disconnecting the movable contact members and the terminals connected to the leading-in conductors, the removable switch unit can be readily removed from or restored in the tank and disconnected from or connected to the leading-in conductors, without requiring flexible conductors between the movable contact members and the terminals and without requiring the manual loosening or fastening of any of the parts.

I do not desire to be confined to the exact details shown, but aim to cover all modifications which do not involve a departure from the spirit and scope of my invention as set forth in the appended claims.

Having thus described my invention what I claim is:

1. In a switch, a pair of coöperating contact members having plane engaging faces, and means for giving the contact members a relative rotary movement in a plane substantially perpendicular to said faces so as to bring them into engagement, and then a relative linear movement.

2. In a switch, a stationary contact, a movable contact, said contacts having plane engaging faces, and mechanism for turning or rotating the movable contact in a plane substantially perpendicular to said faces so as to bring it into engagement with the stationary contact and then for giving it a linear movement so that it will slide relatively to said stationary contact.

3. In a switch, a stationary contact, a movable contact, a support for the latter, and mechanism for turning said support through a suitable arc so as to cause the movable contact to engage the stationary contact, and then for giving said support a linear movement so as to cause the movable contact to slide over the face of the stationary contact.

4. In a switch, a stationary contact, a movable contact, a support for the latter, and mechanism for turning said support through a suitable arc so as to cause the movable contact to engage the stationary contact, and for shifting said support vertically so that the movable contact is caused to slide over the face of the stationary contact.

5. In a double throw switch, a pair of stationary contacts, a movable contact adapted to engage either of said stationary contacts, a support for the movable contact, and means for turning said support through an arc so as to cause the movable contact to engage either of said stationary contacts, and for giving said support a linear movement so that the movable contact will slide over the face of either of said stationary contacts when shifted into engagement therewith.

6. In a switch, a stationary contact, a movable contact, a rotary member carrying the movable contact, a support for said contact carrying member, said support permitting the latter to be turned therein and to be given a linear movement, and operating mechanism connected to said contact carrying member.

7. In a switch, a supporting frame, a stationary contact, a movable contact, a member supporting said movable contact, said frame having a member provided with a slot in which said contact supporting member is mounted, and means for turning said contact supporting member in one portion of the slot, and then shifting it to another portion whereby the movable contact may be turned through an arc and brought into engagement with the stationary contact, and will then be given a linear movement relative thereto.

8. In a switch, a supporting frame, a stationary contact, a movable contact adapted to coöperate therewith, a rotary supporting member for said movable contact, said frame having portions provided with slots in which said rotary supporting member is journaled, and operating mechanism for turning said rotary supporting member in the slots so as to cause the movable contact to engage the stationary contact and for shifting said rotary supporting member longitudinally in said slots.

9. In a switch, a stationary contact, a movable contact adapted to engage the same, a rotary and linearly movable member supporting the movable contact, supporting means provided with slots which receive said supporting member for the movable contact, means for normally holding said supporting member in the upper ends of the slots, and operating mechanism for turning said supporting member in the upper ends of the slots so as to cause the movable contact to engage the stationary contact and for shifting said supporting member longitudinally of said slots.

10. In a switch, a plurality of stationary contacts, a plurality of movable contacts adapted to coöperate therewith, a rotary and linearly movable rod carrying said movable contacts, a pair of supporting brackets having elongated openings which receive said rod, means for normally holding the rod at the ends of the slots, and operating mechanism for turning the rod through a suitable arc so as to cause said movable contacts to engage the stationary contacts and for depressing the rod in the slots so as to cause a relative linear movement between the stationary and movable contacts.

11. In a switch, a stationary contact, a movable contact, a rotary and linearly movable member carrying said movable contact, a support for said member, said support having a slot in which said member is mounted, and operating mechanism comprising a rotary shaft, cranks on the shaft and on the movable contact carrying member, and a link connecting said cranks.

12. In a switch, a stationary contact, a movable contact, a member carrying said movable contact, a support provided with a slot in which said contact carrying member is mounted, means normally holding said member in one end of the slot, and switch operating mechanism comprising a rotary shaft, cranks on the shaft and on the contact carrying member respectively, and a link connecting said cranks.

13. In a double-throw switch, a plurality of stationary contacts, a movable contact adapted to engage either of said stationary contacts, a member carrying said movable contact, a support having an elongated slot in which said contact carrying member is mounted, means normally holding said member in one part of the slot, and operating mechanism for turning said contact carrying member in one direction or the other so as to engage one of the stationary contacts, and for shifting said member along said slot, said mechanism comprising a rotary shaft, cranks carried by the shaft and by the contact carrying member respectively, and links connecting said cranks.

14. In a double throw switch, two sets of stationary contacts, a plurality of movable contacts, a member carrying said movable contacts, a support having an elongated slot in which said contact carrying member is mounted, means normally holding the latter in one part of the slot, operating mechanism for turning said contact carrying member in one direction or the other so that it will engage one of the sets of stationary contacts, and then for shifting said member longitudinally of the slot whereby said movable contact members will be shifted linearly with respect to the stationary contacts which they engage, said mechanism comprising a rotary shaft, a bell crank carried thereby, a crank carried by the contact carrying member, and links pivotally connected to the bell crank on the shaft and loosely connected to the crank on the contact carrying member.

15. In a switch, a plurality of stationary contacts and conductors electrically connected thereto, a plurality of stationary terminals having conductors electrically connected thereto, and movable switch mechanism in the form of a unit removable as a whole from the other portions of the switch, said unit comprising a support and contact members mounted on said support and movable relatively thereto, said contact members having portions which are permanently connected electrically to the terminals while the unit is in normal position and are disconnected therefrom when the unit is removed.

16. In a switch, a set of stationary contacts having conductors connected thereto, a set of stationary terminals having conductors connected thereto, movable switch mechanism in the form of a unit which is removable as a whole from the relatively stationary portions of the switch, said unit comprising a support and contact members mounted on said support and movable relatively thereto, said contact members being permanently connected to said terminals while the unit is in place and said terminals and contact members having separable tongue and jaw connections.

17. In a double throw switch, two sets of stationary contacts having leading out conductors connected thereto, a set of terminals having leading in conductors connected thereto, and having laterally projecting jaws, movable switch mechanism in the form of a unit removable as a whole from the relatively stationary mechanism, said unit comprising a support, and a support and contact members mounted on said support and movable relatively thereto, said contact members having tongues which engage said jaws, so that the movable contact members are permanently electrically connected to the terminals while the unit is in normal position but may be readily disconnected therefrom when the unit is removed.

Milwaukee, Wis., March 24, 1910.

In testimony whereof I affix my signature, in the presence of two witnesses.

BRADLEY HASKINS.

Witnesses:
 JOSEPH F. MENNINGEN,
 CHAS. L. BYRON.